United States Patent [19]

Miyazaki et al.

[11] Patent Number: 4,783,731
[45] Date of Patent: Nov. 8, 1988

[54] MULTICOMPUTER SYSTEM HAVING DUAL COMMON MEMORIES

[75] Inventors: Yoshihiro Miyazaki, Hitachi; Jushi Ide, Mito; Takeshi Kato; Hiroaki Nakanishi, both of Hitachi; Tadaaki Bandoh, Toukai, all of Japan

[73] Assignee: Hitachi, Ltd., Tokyo, Japan

[21] Appl. No.: 30,266

[22] Filed: Mar. 24, 1987

Related U.S. Application Data

[63] Continuation of Ser. No. 513,077, Jul. 12, 1983, abandoned.

[30] Foreign Application Priority Data

Jul. 15, 1982 [JP] Japan ............................. 57-122151

[51] Int. Cl.⁴ ...................... G06F 13/00; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,573,855 | 4/1971 | Cragon et al. | 364/200 |
| 3,763,474 | 10/1973 | Freeman et al. | 364/200 |
| 4,025,903 | 5/1977 | Kaufman et al. | 364/200 |
| 4,231,087 | 10/1980 | Hunsberger et al. | 364/200 |
| 4,354,225 | 10/1982 | Frieder et al. | 364/200 |
| 4,387,427 | 6/1983 | Cox et al. | 364/200 |
| 4,439,830 | 3/1984 | Chueh | 364/200 |
| 4,473,878 | 9/1984 | Zolnowsky et al. | 364/200 |
| 4,486,834 | 12/1984 | Kobayashi et al. | 364/200 |
| 4,503,491 | 3/1985 | Lushtak et al. | 364/200 |

*Primary Examiner*—Eddie P. Chan
*Attorney, Agent, or Firm*—Antonelli, Terry & Wands

[57] ABSTRACT

A multicomputer system having dual common memories in which specified address areas are set within the common memories. The specified address areas are accessible irrespective of whether a CPU is in an online mode or a debug mode, while any area other than the specified address areas is accessible only when the function mode of the common memory is in agreement with the access mode of the CPU. In correspondence with each CPU, addresses to be used by the CPU are divided into a plurality of groups of addresses, and the access modes are set for the respective address groups.

12 Claims, 7 Drawing Sheets

MULTICOMPUTER SYSTEM HAVING DUAL COMMON MEMORIES

This application is a continuation of application Ser. No. 513,077 filed July 12, 1983, now abandoned.

BACKGROUND OF THE INVENTION

1. <Field of the Invention>

The present invention relates to a multicomputer system having dual common memories. More particularly, it relates to a multicomputer system wherein debug by a certain computer can be readily performed by utilizing the stored contents for online processing and without destroying the stored contents when another computer is executing the online processing by the use of a common memory.

2. <Prior Art>

A multicomputer system having dual common memories has been known from the official gazette of Japanese Laid-open Patent Application No. 52-123137 (entitled "Dual Memory Control System", invented by KOBAYASHI et al).

According to this system, each of the dual memory devices transmits a signal indicating whether or not the memory device itself is normal and a signal indicating whether or not it is requesting maintenance. On the other hand, each CPU transmits a flag indicating whether a program being currently run is a maintenance program or an ordinary program. In the control of access to the dual common memories, in case of the maintenance program, only the memory device which is requesting the maintenance is accessed so as to prevent the destruction of the content of the normal memory device, while in case of the ordinary program, only the normal memory device is accessed (both the memory devices are accessed when they are normal).

In such multicomputer system, there is the need that, while an online operation is being performed with a certain CPU, the alterations and debug of a program are to be done with another CPU without the risk of hampering the online operation.

It has hitherto been common practice to meet the need by completely isolating the common memories.

More specifically, the respective CPUs store an access mode of either online access or debug access, while the respective common memories store a function mode of either online mode or debug mode. When the mode of access from the CPU is in agreement with the function mode of the common memory, the access is valid, and when they are not in agreement, the access is invalid. Consequently, the CPU storing the online access is accessible to only the common memory storing the online mode, and the CPU storing the debug access is accessible to only the common memory storing the debug mode.

With such measure, the CPU to perform the debug access cannot access the common memory of the online mode and so there is no fear to erroneously destroy the content thereof and to impede the online operation.

The prior-art example, however, has two disadvantages as described below.

As one of them, in a system having input/output equipment (hereinbelow, termed "common I/O" which can be controlled by both of two CPUs, it becomes difficult that the CPU under debug uses the common I/O and that the online CPU is backed up when down. The reason is that, when the common memories are completely isolated for the online CPU and the debug CPU, an operating system program cannot handle common I/O management information and operation mode information on the common memories in common.

The other disadvantage is that the debug program cannot view the information of the online operation. In case of a plant control, when a program is to be partly reorganized and then debugged, it is wished to assure that the control program can follow properly on the basis of input information from a plant as formed on the common memories by the online CPU. With the prior-art example, the assurance is difficult to be realized.

As another known example, there is a system disclosed in the official gazette of Japanese Laid-open Patent Application No. 56-14364 (entitled "Common Memory Control System", invented by NOGUCHI et al.).

Here are taught A-type common memories and B-type common memories which are respectively accessible from a plurality of CPUs. The A-type common memory permits a read/write operation from the CPU in an online condition. The B-type common memory permits a read/write operation from the offline CPU, and also permits only a write operation from the CPU in the online condition.

Since, with this measure, the A-type common memory is not accessed by the offline CPU, the online CPU does not have its operation hampered by the offline CPU. Moreover, since the B-type common memory has the writing operation performed by the online CPU, the software of the offline CPU can be developed using the status information of the online control system, so that the software can be rendered "online" stepwise.

This prior-art system, however, does not include any common data area in which both the online CPU and the offline CPU can read/write and cannot realize a common I/O control or a system setup control.

SUMMARY OF THE INVENTION

An object of the present invention is to provide a multicomputer system having dual common memories in which a common I/O control and a system setup control are possible and in which a CPU under debug can execute simulation while referring to online data.

A characterizing feature of the present invention for accomplishing the object consists in setting a specified address range, so that the address range is accessible in both an online mode and a debug mode, while an area outside the range is accessible only when an access mode and a function mode are in agreement.

As another feature of the present invention, in correspondence with each CPU, addresses to be used by the CPU are divided into a plurality of groups of addresses, an access mode can be set for each address group, and a common memory is accessed by the set access mode.

As still another feature of the present invention, write protection information for inhibiting writing into common memories can be set for respective address groups of each CPU, and writing into any improper common memory is automatically detected and prevented.

Further objects and features of the present invention will become apparent from the following description of embodiments.

BRIEF DESCRIPTION OF THE DRAWINGS

FIGS. 2 to 6 are diagrams each showing an embodiment for realizing the present invention, in which FIG. 2 shows a common memory port (8), FIG. 3 shows an address translation unit (26), FIG. 4 shows a computer port (7), FIG. 5 shows a memory control unit (6) and FIG. 6 shows a function check unit (84)

DETAILED DESCRIPTION OF THE PREFERRED EMBODIMENTS

Figure 1:
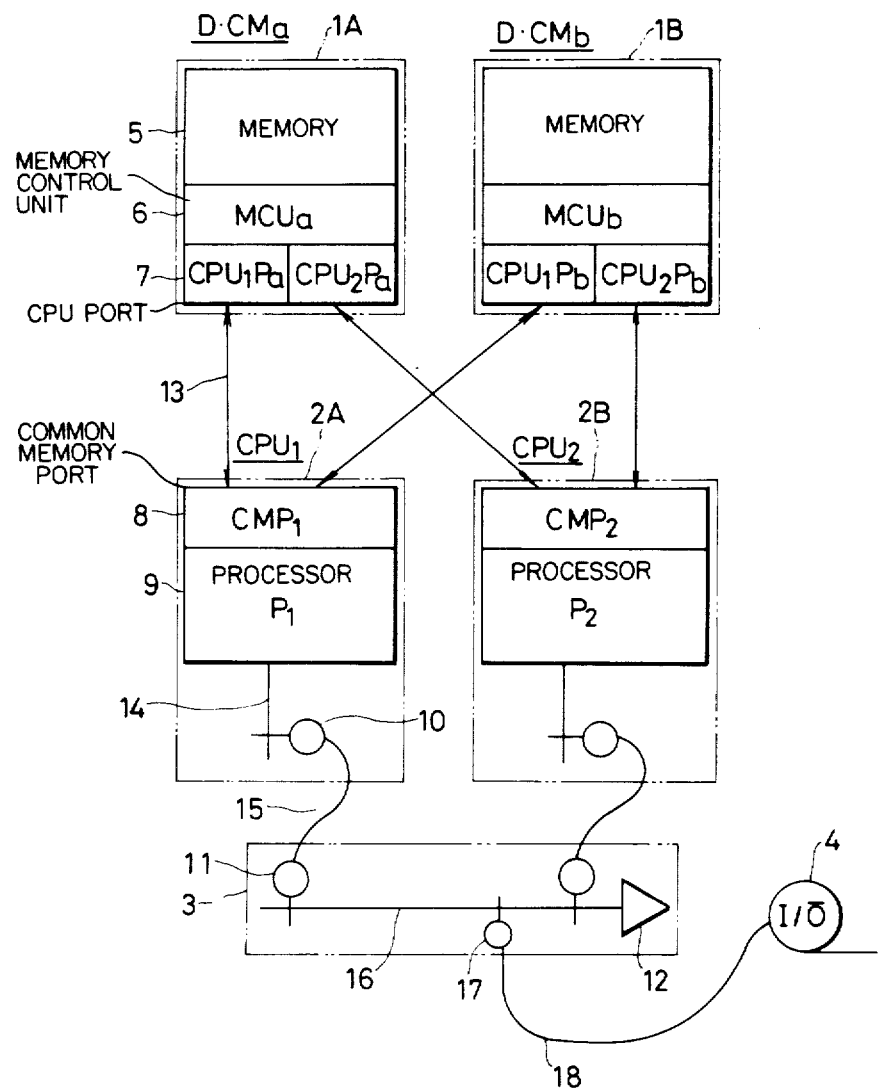
FIG. 1 is a diagram showing an example of a multicomputer system to which the present invention is applied.

First, a multicomputer system on which the present invention is premised will be described with reference to FIG. 1.

In the figure, each of dual common memories (D-CM) 1A, 1B is constructed of a memory main portion (M) 5, a memory control unit (MCU) 6, and CPU ports (CPU P's) 7 in a number equal to that of CPUs connected. The MCU 6 has the functions of controlling the read/write operation (hereinbelow, abbreviated to "R/W" of the M 5, and selecting requests from the CPU P's 7 and processing them in the order of acceptance. The CPU P 7 is connected to the CPU 2A or 2B through an interface 13 located between the common memory and the CPU. The CPU 2A (or CPU 2B) is constructed of a common memory port (CMP) 8, a processor (P) 9, an input/output bus 14, and an input-/output channel 10. The common memory port 8 is connected to the respective dual common memories 1A, 1B through the two interfaces 13 between the common memories and the CPU. It transmits a common memory access request from the processor 9 to both the common memories, and when normal data is obtained from either common memory, it sends it back to the processor 9. The processor 9 has the functions of storing, decoding and executing a program, and performs the access to the common memories and the controls of input/output equipment in accordance with the program. The input/output channel 10 in a number of at least one is connected to the input/output bus 14, and controls the data transmission between the processor 9 and the input/output equipment. In addition, a common input/output bus unit 3 is provided for connecting a common input/output equipment 4 for the CPUs. The common input/output bus unit 3 is constructed of a common input/output bus 16, a bus controller 12 for controlling the bus, CPU ports 11 connected to the bus 16 in the number of the CPUs in order to exchange data with the input/output channels 10 of the CPUs through interfaces 15 located between the CPUs and the common bus, and an input/output channel 17 connected to the bus 16 in order to exchange data with the common input/output equipment 4 through an interface 18 located between the common bus and the input/output equipment.

The present invention is applied to the multicomputer system as described above.

Figure 2:
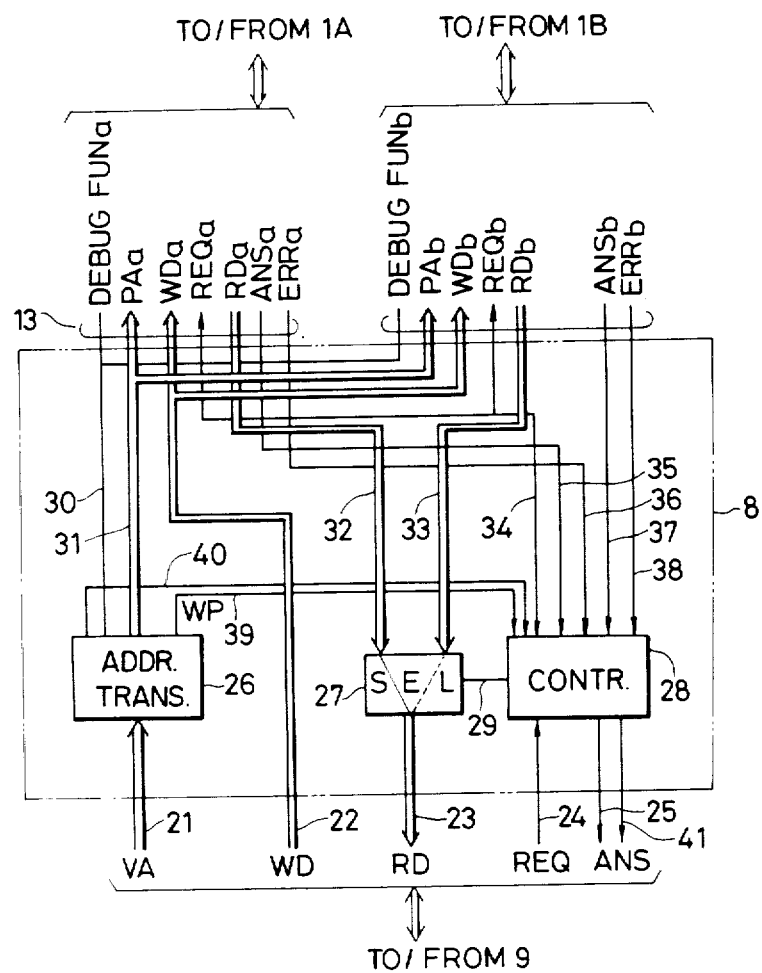

In the ensuing embodiments of the present invention, it is the common memory port 8 and the memory control unit 6 that have functions different from those of the prior-art example in FIG. 1. FIG. 2 shows a practicable embodiment of the common memory port 8. A virtual address (VA) 21 sent from the processor 9 is inputted to an address translation unit 26. The expression "virtual address" signifies an address as viewed from a program. This address is translated into a physical address 31 by the address translation unit 26. The expression "physical address" signifies an address corresponding to the actual memory device. The unit 26 provides a debug function signal 30, a write protection signal 39 and an address translation valid signal 40 which correspond to the virtual address. The debug function signal 30 indicates, when it is at logic level "1", that the access concerned is a debug access, and when it is at logic level "0", that the access concerned is an online access. The physical address 31 and the debug function signal 30 are outputted to the respective dual common memories 1A, 1B. Write data (WD) 22 sent from the processor 9 is outputted to the respective dual common memories 1A, 1B as it is. Read data (RDa, RDb) 32, 33 delivered from the respective dual memories are inputted to a data selection unit 27, and either of them is selected and delivered to the processor 9 as read data (RD) 23. The internal control unit (CONT) 28 of the common memory port 8 starts an access operation upon receiving a request signal (REQ) 24 from the processor 9. When the write protection signal (WP) 39 is "0" and the address translation valid signal 40 is "1", the internal control unit 28 delivers a request signal 34 to the respective common memories 1A, 1B. It receives answer signals (ANS) 34, 37 and error report signals (ERR) 36, 38 from the respective common memories 1A, 1B and supplies the data selection unit (SEL) 27 with a read data selection appointment signal 29 so as to select the errorless signal. It ends the access operation by outputting an answer signal 25 to the processor 9. If the write protection signal 39 is "1" or the address translation valid signal 40 is "0", or if both the error report signals 36, 38 from the common memories 1A, 1B are "1", the internal control unit 28 brings an error report signal 41 to "1" when outputting the answer signal 25 to the processor 9.

Figure 3:
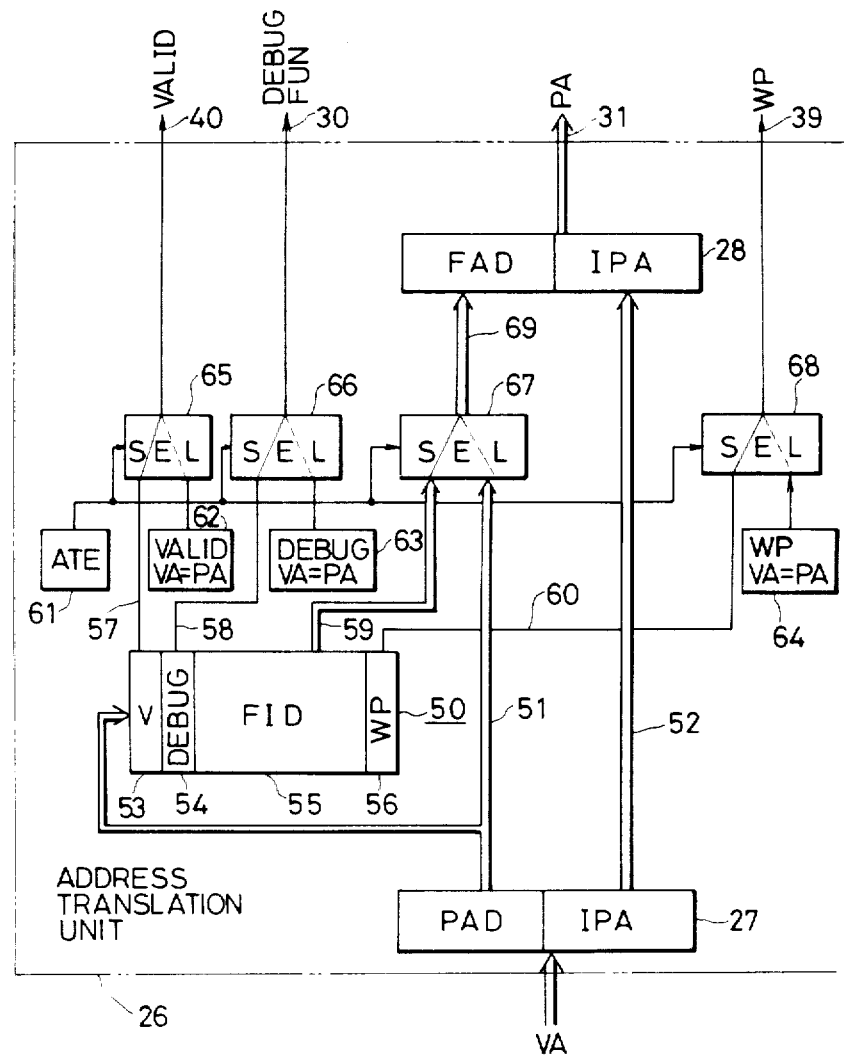

FIG. 3 shows the internal setup of the address translation unit 26 within the common memory port 8 elucidated with reference to FIG. 2. The virtual address (VA) 21 consists of a plurality of signals, which are set in a virtual address register 27. The content of the virtual address register 27 is divided into two parts, one of which shall be called a "page address" (PAD) 51 and the other of which shall be called an "inner page address" (IPA) 52. Each page has the inforamtion which consists of a valid bit (V) 53, a debug bit (DEBUG) 54, a frame address (FID) 55 and a write protection bit (WP) 56, which are stored in a rewritable memory 50. The memory contents can be initialized and altered midway by the program. In correspondence with a certain page address 51, the memory 50 delivers an address translation valid signal 57, a debug function signal 58, a frame address 59 and a write protection signal 60. They are applied to one-side inputs of an address translation valid signal selector 65, a debug function signal selector 66, a frame address selector 67 and a write protection signal selector 68 in the order mentioned. The inputs of these selectors on the other sides receive an output from a valid bit 62 at disabled address translation, an output from a debug bit 63 at disabled address translation, the page address 51, and an output from a write protection bit 64 at disabled address translation in the order mentioned. When an address translation enable flag (ATE) 61 is "1", the former group of inputs is selected, and when "0", the latter group of inputs is selected. The disabled address translation valid bit 62, the disabled address translation debug bit 63 and the disabled address translation write protection bit 64 are fixed or can be initialized by the program. The address translation enable bit 61 has initializable means. Ordinarily, it is "0" at first and is rewritten into "1" after the operating system program has set the address translation information 53-56. The outputs of the group of selectors 65-68 become the address translation valid signal 40, the debug function signal 30, a frame address (FAD) 69 and the write protection signal 39 in the order mentioned. The frame address 69 and the inner page address 52 are combined, set in a physical address register 28 and become the physical address 31.

Figure 4:
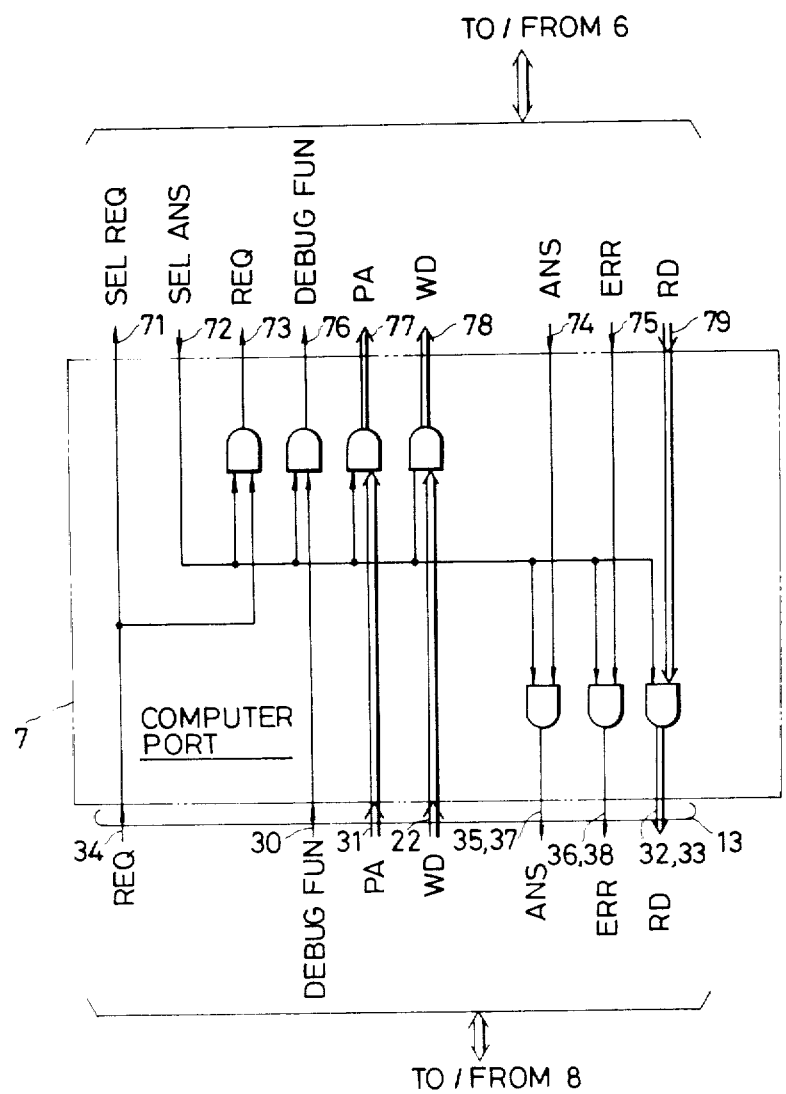

FIG. 4 shows an example of setup of the CPU port 7. The request signal 34 from the common memory port 8 is inputted, and it is directly outputted to the common memory control unit 6 as a selection request signal (SEL REQ) 71. The common memory control unit 6 monitors the request signals outputted from the respective CPU ports 7. It selects any one of the CPU ports 7 whose request signals are "1", and it supplies only the selected port with a selection answer signal (SEL ANS) 72. The selection answer signal 72 is inputted to the CPU port 7. This signal is coupled to the control inputs of all gates within the CPU port 7, and these gates become open when the signal becomes "1". In accordance with the opening of the gates, the request signal (REQ) 34, debug function signal 30, physical address 31 and write data 22 which have been outputted from the common memory port 8 are respectively delivered to the common memory control unit 6 as a request signal 73, debug function signal 76, physical address 77 and write data 78. In addition, an answer signal 74, error report signal 75 and read data 79 which have been outputted from the common memory control unit 6 are respectively delivered to the common memory port 8 as the answer signal 35 or 37, error report signal 36 or 38, and read data 32 or 33.

Figure 5:
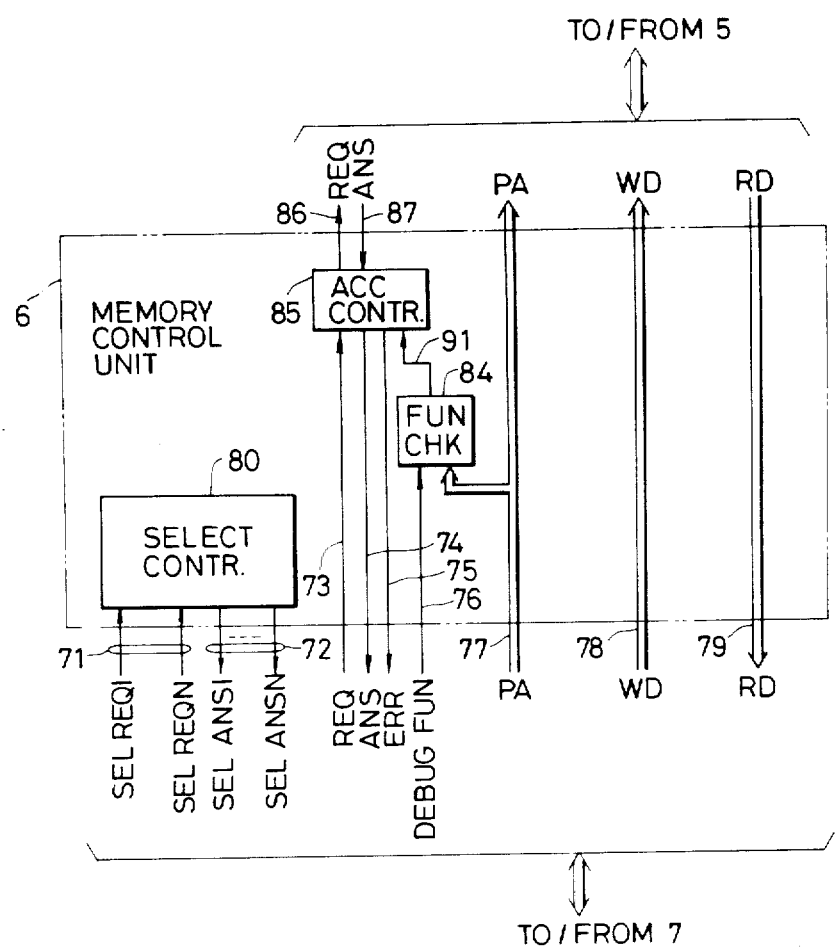

FIG. 5 shows an example of the setup of the memory control unit 6. A select controller 80 accepts the select request signals 71 from the respective CPU ports. It selects any one (n=2 in FIG. 1) of the CPU ports 7 whose select request signals are "1", and it supplies only the selected port with a select answer signal 72. Only the CPU port 7 having received this signal can perform transfer to be stated below. First, the CPU port 7 sends the physical address 77, write data 78, debug function signal 76 and request signal 73. The physical address 77 and write data 78 are sent to the memory 5. The physical address 77 and debug function signal 76 are inputted to a function checker 84, and the result of decision is outputted as an access error signal 91. A memory access controller 85 accepts the request signal 73 from the CPU port 7, and delivers a request signal 86 for the memory subject to the access error signal 91 being "0". When the read data 79 and an answer signal 87 are outputted from the memory 5, the former 79 is directly delivered to the CPU port 7, and the latter 87 is delivered to the memory access controller 85, so that the answer signal 74 is outputted to the CPU port 7. At this time, if no error is involved in the access concerned, the error report signal 75 directed to the CPU port 7 is "0". In addition, if the access error signal 91 is "1", the request signal 86 for the memory 5 is not outputted, but the error report signal 75 is immediately brought to "1" and the answer signal 74 is outputted to the CPU port 7.

Figure 6:
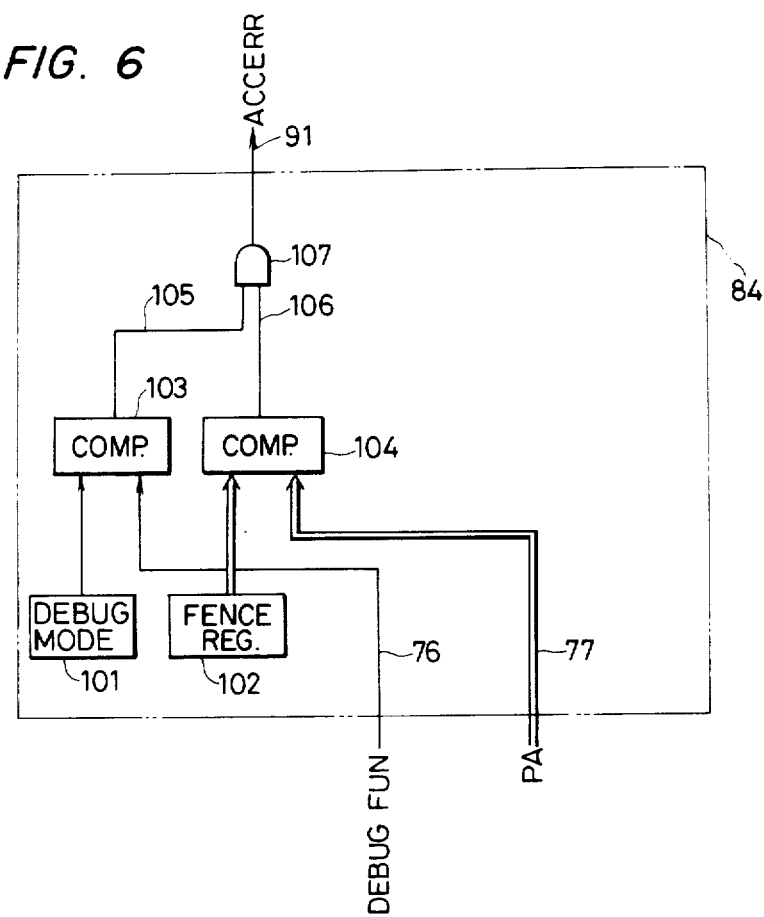

FIG. 6 shows the internal arrangement of the function checker 84 within the memory control unit 6 elucidated with reference to FIG. 5. As the simplest example, the present embodiment will be described on a case where the addresses below a certain boundary physical address are accessible by both the online access and the debug access, while addresses above the boundary physical address are accessible by only the online access in the online mode or the debug access in the debug mode. Within the function checker 84, there are comprised a debug mode bit 101 and a fence register 102 which are characteristic of the present invention. They can be set at will by external switches or the program. The debug mode bit 101 determines the function mode of the common memory, and "1" for this bit indicates the debug mode, while "0" the online mode. The output of the debug mode bit 101 and the debug function signal 76 are compared by a comparator 103. When the result is noncoincidence, that is, when the access concerned is the debug access in the online mode or the online access in the debug mode, a mode function noncoincidence signal 105 which is the output of the comparator 103 becomes "1". In addition, the output of the fence register (FR) 102 and a physical address 88 are compared by a comparator 104. When the physical address is greater than an address indicated by the fence register 102, a fence-over signal 106 which is the output of the comparator 104 becomes "1". An AND unit 107 brings an access error signal 91 to "1" when the mode function noncoincidence signal 105 is "1" and the fence-over signal 106 is "1".

In the above, the arrangement of the embodiment of the present invention has been described with reference to FIGS. 2 to 6. In the next place, the specific operations and effects thereof will be described.

Figure 7:
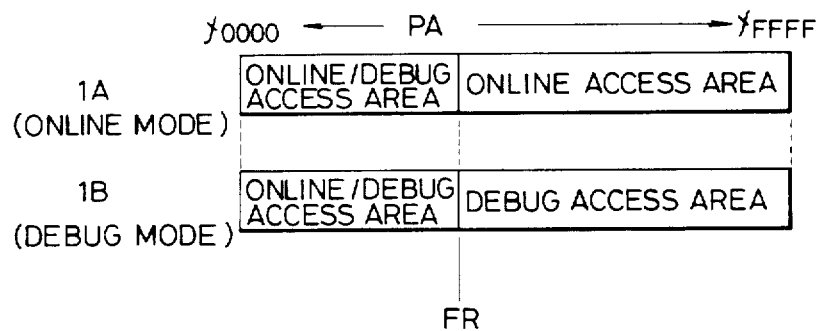
FIGS. 7 to 10 are diagrams each showing a concrete example of application of the present invention.

FIG. 7 shows the accessible functions corresponding to the respective areas of physical addresses PA when one common memory 1B is set at the debug mode in order to perform the debug and the other 1A at the online mode. This figure corresponds to the embodiment of the function checker 84 explained with reference to FIG. 6. When the physical address is smaller than the address FR indicated by the fence register, both the common memories 1A, 1B are accessible by both the online access and the debug access. When the physical address is greater than the address FR, the corresponding area of the common memory 1A set at the online mode is accessible by only the online access, and the corresponding area of the common memory 1B set at the debug mode is accessible by only the debug access. As thus far described, there is realized the partial isolation of the dual common memories that the areas of some physical addresses are common to the online access and the debug access and that the remaining areas are respectively allotted to the online access and the debug access.

Figure 8:
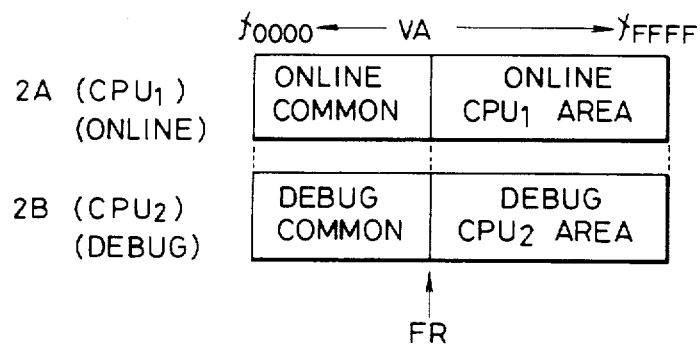

FIG. 8 illustrates the simplest example of use, and shows the service ranges of virtual addresses VA to be used by a CPU 2A (CPU 1) and a CPU 2B (CPU 2). The CPU 1 of the online operation is set at the online access as to all the virtual addresses VA, while the CPU 2 of the debug operation is set at the debug access as to all the virtual addresses VA. The common areas below the address FR of the fence register store common input-/output equipment control information and operation mode information as areas to be used by an operating system. Isolation areas above the fence register address FR are areas to be used by an application program (user areas), and since they are isolated for the online CPU and the debug CPU, the risk is prevented that the application program in the debug operation will erroneously destroy the information on the online side. Regarding the prevention of the risk that the application program might destroy the common areas below the address FR, the common areas can be readily protected by independent means separate from the present invention by exploiting the fact that they have different addresses and are accessed by only the operating system program.

As to the example of application in FIG. 8, detailed operations will be explained below. Regarding the address translation unit 26 (FIG. 3) within the common memory port 8 in the CPU 1 of the online operation, the valid bit 53 is set at "1" and the debug bit 54 and write protection bit 56 are set at "0" in correspondence with all the page addresses 51. In addition, the frame address 55 is set so as to establish the frame address=the page address. This setting is performed when the CPU 1 is started. Owing to such setting, the common memory access which is outputted from the common memory port 8 of the CPU 1 comes to have the debug function signal 30 of "0" and the physical address 31 identical to the virtual address 21 as to all the virtual addresses 21 (VA). Similar setting is performed for the CPU 2 of the debug operation. However, "1" is set for the debug bit, and the debug function signal 30 becomes "1" and the physical address 31 and virtual address 21 become identical as to all the virtual addresses 21. Next, among the virtual addresses VA, those below a certain address are set at the area which is used by the operating system program, and those above the address are set at the area which is used by the application program. To this end, the value of the boundary address FR is set in the fence registers 106 (FIG. 6) of both the dual common memories. Further, the debug mode bit 101 of one common memory is set at "0", and that of the other common memory at "1". The former common memory becomes the online mode one, and the latter common memory the debug mode one. The settings on the common memory side are performed by means of external switches on the common memory side or by running a common memory mode setting program with either CPU, before the program debug is started.

With the above settings, when an address below the boundary address has been accessed by the CPU1, the fence-over signal 106 becomes "0" and the access error signal 91 becomes "0" in the function checker 84 within the memory control unit 6 of the online mode common memory because the value of the physical address 88 is smaller than the value of the fence register 102. At this time, accordingly, the read/write access from the CPU1 to the particular address of the online mode common memory is carried out. Similarly, in the function checker 84 within the memory control unit 6 of the debug mode common memory, the fence-over signal 106 becomes "0" and accordingly the access error signal 91 becomes "0" because the value of the physical address 88 is smaller than that of the fence register 102. Thus, the read/write access from the CPU1 to the particular address of the debug mode common memory is also carried out.

Likewise, when the address below the fence address has been accessed by the CPU2, the read/write accesses to the particular addresses of the online mode common memory and debug mode common memory are carried out.

In the next place, when an address above the boundary address has been accessed by the CPU1; in the function checker 84 within the memory control unit 6 of the online mode common memory, the fence-over signal 106 becomes "1" because of the value of the physical address 88 larger than that of the fence register 102, and the mode function noncoincidence signal 105 becomes "0" because of the debug function signal 76 being "0" and the debug mode bit 101 being "0", so that the access error signal 91 becomes "0". Since, at this time, the access error signal 91 becomes "0", the read/write access from the CPU1 to the particular address of the online mode common memory is carried out. On the other hand, in the function checker 84 within the memory control unit 6 of the debug mode common memory, the fence-over signal 106 becomes "1" because of the value of the physical address 88 larger than that of the fence register 102, and the mode function noncoincidence signal 105 becomes "1" because of the debug function signal 76 being "0" and the debug mode bit 101 being "1", so that the access error signal 91 becomes "1". Since the access error signal 91 becomes "1", the read/write access from the CPU1 to the particular address of the online mode common memory is not carried out.

Likewise, when the address above the fence address has been accessed by the CPU2, the access to the particular address of the debug mode common memory is carried out, but the access to the particular address of the online common memory is not carried out.

In the above manner, regarding the areas below the boundary address to be used by the operating system program, both the CPU1 and CPU2 can access them, and regarding the areas above the boundary address to be used by the application program, the CPU1 of the online operation can access only that of the online mode common memory, while the CPU2 of the debug operation can access only that of the debug mode common memory. When the program debug has ended, the debug mode common memory is put into an online mode common memory by setting its debug mode bit 101 at "0", and the content of the common memory already used as the online mode one is copied in the common memory brought to the online mode anew, by any copy means separately disposed, whereby the common memories are used as ones dualized over all the addresses. In addition, the debug bits 54 corresponding to all the page addresses of the CPU2 are rewritten into "0". Thus, the CPU2 also performs the online operation.

Figure 9:
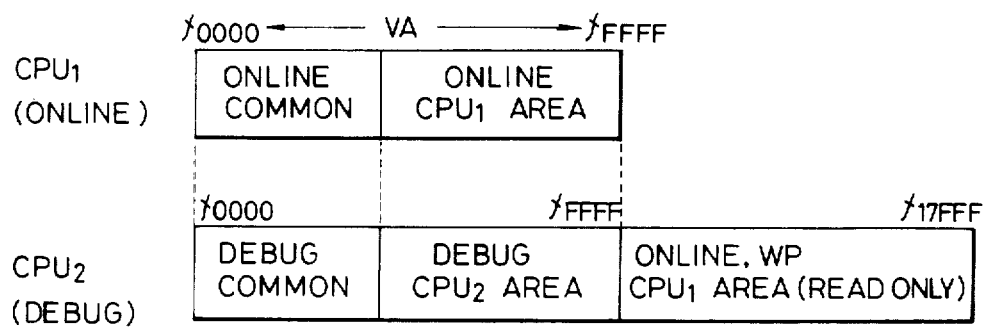

FIG. 9 shows another example of use. The CPU1 of the online operation performs the online access for all the virtual addresses VA. The CPU2 of the debug operation performs the debug access for that component of the virtual addresses which covers all the physical addresses, and performs the online access for the other component which covers the isolated online area. Besides, the virtual addresses VA of the latter correspond to the physical addresses of the online area. In addition to the advantage on the debug as explained with reference to FIG. 8, this example of application has the advantage that plant information etc. which online CPU has processed and formed on the online area can be received. It is therefore possible that the debug program receives the same inputs as those of the program of the online CPU, to check if the same outputs are to be delivered, or that the outputs of both the programs are compared, to check the correlation thereof. Thus, the degree of perfection of the debug can be enhanced. Moreover, by turning "on" the write protection bits which correspond to the online area to be accessed by the debug CPU, this area is prohibited from being written, and the risk can be readily avoided that the online area will be destroyed by the debugging application program.

As to the example of application in FIG. 9, the detailed operations will now be explained. Regarding the address translation unit 26 (FIG. 3) within the common memory port 8 in the CPU1 of the online operation, when the virtual addresses = the physical addresses is held; in correspondence with all the page addresses 51 in which the physical addresses exist actually, the valid bit 53 is set at "1", the debug bit at "0" and the write protection 56 bit at "0". In addition, the frame addresses 55 are so set that the frame addresses = the page addresses is held. The settings are performed when the CPU1 is started. Owing to such settings, the commom memory access which is provided from the common memory port 8 of the CPU1 comes to have the debug function signal 30 of "0" and the physical address 31 identical to the virtual address 21 for all the virtual addresses 21 (VA). On the other hand, regarding the address translation unit 26 within the common memory port 8 in the CPU2 of the debug operation, when the virtual addresses = the physical addresses is held; in correspondence with all the page addresses 51 in which the physical addresses exist actually, the valid bit 53 is set at "1", the debug bit 54 at "1" and the write protection bit 56 at "0", while the frame addresses 55 are so set as to hold the frame addresses = the page addresses. Further, when the virtual addresses = the physical addresses is held; regarding that capacity of page addresses among page addresses having no actually existing physical addresses which covers all the physical addresses to be used by the application program, the valid bit 53 is set at "1", the debug bit at "0" and the write protection bit 56 at "1", while the frame addresses 55 are set so that the aforementioned page addresses may correspond to the frame addresses of the physical addresses to be used by the application program. The settings are performed when the CPU2 is started. Owing to such settings, when the common memory access from the common memory port 8 of the CPU2 is issued within the range of the actually existing physical addresses, the debug function signal 30 becomes "1" and the physical address 31 becomes identical to the virtual address 21, and when the virtual address which falls outside the range of the actually existing addresses and which corresponds to the area to be used by the application program is accessed, the debug function signal 30 becomes "0" and the physical address 31 becomes the physical address used by the application program. Moreover, the latter access is capable of only reading. The description of the settings of the fence register 102 (FIG. 6) and the debug mode bit 101 on the common memory side shall be omitted because it is quite the same as the explanation of FIG. 8.

Figure 10:
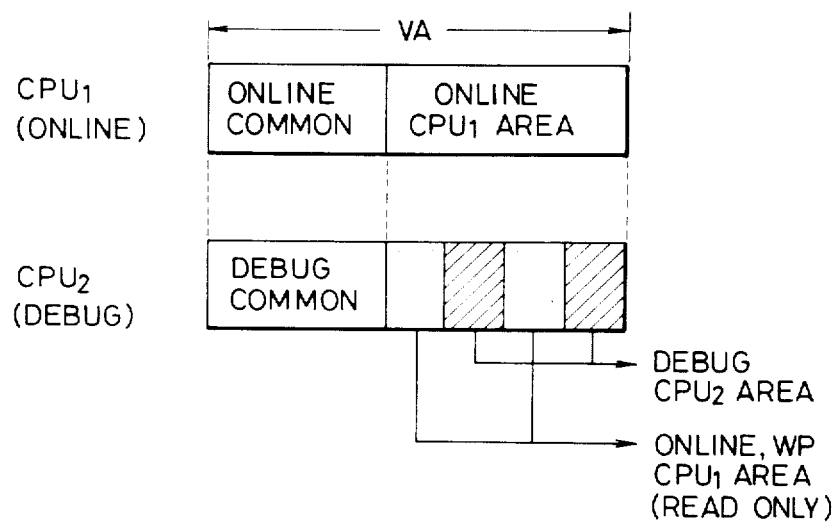

FIG. 10 shows another example of use. The CPU1 of the online operation performs the online access for all the virtual addresses VA, while the CPU2 of the debug operation performs the online access to parts of the application area, the write protection bits being turned "on" in the parts, and it performs the debug access to the remaining parts of the area. In this example of application, the debug program can directly use and process plant information which the online CPU has processed and formed on the online area. Although the debug of a program to be written in the area, namely, a program to receive the plant information is impossible with the present method, the debugs of many other programs can be performed in quite the same state as the online run state.

As to the example of application in FIG. 10, the detailed operations will now be described. Regarding the address translation unit 26 (Figure 3) within the common memory port 8 in the CPU1 of the online operation, in correspondence with all the page addresses 51, the valid bit 53 is set at "1", the debug bit at "0" and the write protection bit 56 at "0", while the frame addresses 55 are so set as to hold the frame addresses = the page addresses. The settings are performed when the CPU1 is started. Owing to such settings, the common memory access which is issued from the common memory port 8 of the CPU1 comes to have the debug function signal 30 of "0" and the physical address 31 identical to the virtual address 21 for all the virtual addresses 21 (VA). On the other hand, regarding the address translation unit 26 (Figure 3) within the common memory port 8 in the CPU2 of the debug operation, as to all the page addresses, the frame addresses 55 are so set as to hold the frame addresses = the page addresses. As to the area to be used by the operating system and the write area of the application program to be debugged, the valid bit 53 is set at "1", the debug bit at "1" and the write protection bit 56 at "0". Further, as to that read area of the application program in which the information on the online CPU side are to be read, the valid bit 53 is set at "1", the debug bit at "0" and the write protection bit 56 at "1". The settings are performed when the CPU2 is started. Owing to such settings, the common memory access which is issued from the common memory port 8 of the CPU2 comes to have the physical address 31 identical to the virtual address 21 for all the virtual addresses 21 (VA). Only in the area in which the information on the online CPU side are to be used, will the debug function signal 30 be "0", and only a read operation is permitted. In the other area, the debug function signal 30 becomes "1".

As apparent from the foregoing, according to the present invention, it is possible, owing to the partial isolation of the dual common memories, to protect the service area of an online CPU from the program of a debug CPU being debugged and to secure the common areas of the online CPU and debug CPU to be used by an operating system.

This facilitates the debugging CPU to use a common I/O, and to back up the online CPU when it is down.

Further, it is readily realizable to view the exclusive area of the online CPU from the debug CPU. This is effective to secure the safety of debug during an online operation and to enhance the degree of perfection of the debug.

Although the foregoing embodiments have assumed the case of two CPUs, it is to be understood that, in case of three or more CPUs, quite the same usage is possible by dividing the CPUs into two groups, including the group of online CPUs and the group of debug CPUs.

We claim:

1. In a multicomputer system having dual commom memories and plural computers which share said dual common memories, each dual common memory including a memory unit which has an operating system program area and a user program area, and memory access control means connected to the plural computers for permitting an access for read/write of data from any one of said computers to said memory unit; wherein each computer comprises access mode setting means for indicating either an online access or a debug access for each of a plurality of groups of divided addresses in each dual common memory; while said memory access control means in each dual common memory comprises function mode setting means for setting either an online mode or a debug mode for the associated memory unit, and checking means connected to the function mode setting means and responsive to an access mode signal from an access mode setting means for detecting a coincidence or noncoincidence between the access mode of the computer providing said access mode signal and said function mode in said memory access control means at the time of access by the computer to said dual common memory, and control means responsive to said checking means for rejecting said memory access at the time of detected non-coincidence between said access mode and said function mode and for allowing said memory access at the time of coincidence between said access mode and said function mode for an address area to be accessed in said dual common memory.

2. A multicomputer system according to claim 1, wherein said memory access control means further comprises address area setting means for setting a value representing a specified address area and means connected to the address area setting means and the function mode setting means for overriding said control means by allowing both the online access and the debug access irrespective of the content of the function mode set within said memory access control means, when an address of the memory access falls within the specified address area set in said address area setting means.

3. A multicomputer system according to claim 1, wherein each computer further comprises a write protection information setting means for storing write protection information for selected storage areas of said dual commom memory write control means for generating a memory access signal and an address signal to be sent to at least one dual common memory to effect a writing of data into the memory unit therein, and means connected to the write protection information setting means for inhibiting said write control means from effecting a write operation into said selected storage areas for which said write protection information is stored by said setting means.

4. A multicomputer system having dual commom memories and plural computers which are connected to and share said dual common memories, each dual commom memory including a memory unit which is divided into a plurality of groups of addressable storage locations and memory access control means connected to said plural computers for controlling an access for read/write of data from any one of said computers to said memory unit of said dual common memory in response to receipt of a memory request signal from that computer; wherein each computer comprises memory address generating means for generating address signals indicating memory storage locations to be accessed in said memory units of said dual common memories and for sending said address signals to said dual common memories, and access mode setting means responsive to said memory address generating means for providing an access mode signal indicating either an online access or a debug access for each of said plurality of groups of addressable storage locations in the memory unit of each dual common memory; and wherein said memory access control means in each dual common memory comprises function mode setting means for providing a function mode signal indicating either an online mode or a debug mode for the associated memory unit, checking means connected to receive said function mode signal from the function mode setting means and responsive to an access mode signal received from an access mode setting means of at least one of said computers for detecting a coincidence or noncoincidence between the access mode of the computer providing said access mode signal and the function mode of said memory unit at the time of access by the computer to said dual common memory, and control means responsive to an output from said checking means for rejecting said memory access at the time of detected non-coincidence between said access mode and said function mode and for allowing said memory access at the time of coincidence between said access mode and said function mode for a memory storage location to be accessed in said dual common memory.

5. A multicomputer system according to claim 4, wherein said memory address generating means generates a debug/online mode bit with each address signal for a memory storage location, and said access mode setting means is responsive to said debug/online mode bit for generating said access mode signal.

6. A multicomputer system according to claim 4, wherein said memory access control means further comprises address area setting means for identifying a specified address area of the associated memory unit and means connected to the address area setting means and said checking means for causing said control means to allow both the online access and the debug access irrespective of the content of said function mode signal produced within said memory access control means, when an address of a memory location indicated by an address signal received from said memory address generating means falls within the specified address area identified by said address area setting means.

7. A multicomputer system according to claim 6, wherein the memory unit of each dual common memory has an operating system program area and an adjacent user program area with a boundary address defining the boundary between these two areas, and said address area setting means in each memory access control means includes means for holding said boundary address and comparator means for comparing the boundary address from said holding means with an address signal received from the memory address generating means of one of said computers and for producing an output signal indicating whether the received address signal indicates a memory storage location in said operation system program area or said user program area.

8. A multicomputer system according to claim 7, wherein said means in said memory access control means for allowing both online access and debug access irrespective of the content of said function mode signal comprises gate means connected between said checking means and said control means and responsive to the output signal of said comparator means for controlling said control means to permit both online access and debug access to said memory unit when said received address signal indicates a memory storage location in the operating system program area of said memory unit.

9. A multicomputer system according to claim 4, wherein each computer further comprises write protection information setting means for storing write protection information for selected storage areas of said dual common memory, means for generating a memory request signal to be sent to at least one dual commom memory along with an address signal from said memory address generating means to effect a writing of data into a memory storage location of the memory unit therein, and means connected to the write protection information setting means for selectively inhibiting said memory request signal generating means to prevent a write operation into said selected storage areas for which said write protection information is stored by said write protection information setting means.

10. A multicomputer system having dual commom memories and plural computers which are connected to and share said dual common memories, each dual common memory including a memory unit which is divided into a plurality of groups of addressable storage locations and memory access control means connected to said plural computers for controlling an access for read/write of data from any one of said computers to said memory unit of said dual common memory in response to receipt of a memory request signal from that computer; wherein each computer comprises memory address generating means for generating address signals indicating memory storage locations to be accessed in said memory units of said dual common memories, and access mode setting means responsive to said memory address generating means for providing to said memory access control means of each dual common memory an access mode signal indicating either an online access or a debug access for each of said plurality of groups of addressable storage locations in the memory unit of each dual common memory; and wherein said memory access control means in each dual common memory includes control means for controlling access to the associated memory unit in response to said access mode signal received from a computer attempting access to the dual common memory; and wherein said access mode setting means includes means responsive to said memory address signals for setting an access mode in at least one of the computers operating in a debug mode as an online access for a part of the storage locations which are common to the computers and as a debug access for the outer part of the storage locations which are provided as separate areas for the respective computers so that the common storage locations are accessible by both the online access and the debug access and the outer part of the storage locations are accessible when the access mode of the computer and a function mode of the associated memory unit are in agreement.

11. A multicomputer system according to claim 10, wherein each computer further comprises write protection information setting means for storing write protection information for selected storage areas of said dual common memory, means for generating a memory request signal to be sent to at least one dual commom memory along with an address signal from said memory address generating means to effect a writing of data into a memory storage location of the memory unit therein, and means connected to the write protection information setting means for selectively inhibiting said memory request signal generating means to prevent a write operation into said selected storage areas for which said write protection information is stored by said write protection information setting means.

12. A multicomputer system having dual common memories and plural computers which are connected to and share said dual common memories, each dual common memory including a memory unit which is divided into a plurality of groups of addressable storage locations and memory access control means connected to said plural computers for controlling an access for read/write of data from any one of said computers to said memory unit of said dual common memory in response to receipt of a memory request signal from that computer; wherein each computer comprises memory address generating means for generating address signals indicating memory storage locations to be accessed in said memory units of said dual common memories, and access mode setting means responsive to said memory address generating means for providing to said memory access control means of each dual common memory an access mode signal indicating either an online access or a debug access for each of said plurality of groups of addressable storage locations in the memory unit of each dual common memory; and wherein said memory access control means in each dual common memory includes control means for controlling access to the associated memory unit in response to said access mode signal received from a computer attempting access to the dual common memory, wherein said control means in each memory access control means includes storing means for storing a memory address representing a boundary address between an operating system program area and an adjacent user program area in each memory unit, comparison means for comparing the memory address stored in said storage means to a memory address indicated by an address signal received from one of said computers, and means responsive to said comparison means and said access mode signal for permitting both online and debug access to the associated memory unit regardless of the value of said access mode signal when the memory address indicated by the address signal received from the computer falls within the operating system program area of the memory unit and for permitting either online or debug access to the associated memory unit according to the value of said access mode signal when the memory address indicated by the address signal received from the computer falls within the user program area of the memory unit.

* * * * *